United States Patent
Corr (12)

(10) Patent No.: US 6,624,447 B1
(45) Date of Patent: *Sep. 23, 2003

(54) LOW SKEW SIGNAL DISTRIBUTION FOR INTEGRATED CIRCUITS

(75) Inventor: William Eric Corr, Middlesex (GB)

(73) Assignee: LSI Logic Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/382,946

(22) Filed: Aug. 25, 1999

(30) Foreign Application Priority Data

Aug. 26, 1998 (GB) ................................. 9818622

(51) Int. Cl.$^7$ ...................... H01L 27/15; H01L 31/0232
(52) U.S. Cl. ........................ 257/82; 257/81; 257/98; 257/99; 257/432; 257/433; 257/434
(58) Field of Search ........................... 257/81, 82, 99, 257/98, 433, 434, 80, 84, 100, 432, 435; 438/55, 22, 24, 25, 26, 28, 51, 64, 65; 385/14, 49

(56) References Cited

U.S. PATENT DOCUMENTS

| 5,198,684 | A | * | 3/1993 | Sudo | ........................... 257/79 |
|---|---|---|---|---|---|
| 5,250,816 | A | * | 10/1993 | Kitamura | ...................... 257/81 |
| 5,266,794 | A | * | 11/1993 | Olbright et al. | ....... 250/214 LS |
| 5,335,361 | A | * | 8/1994 | Ghaem | ......................... 455/66 |
| 5,394,490 | A | | 2/1995 | Kato et al. | |
| 5,424,573 | A | * | 6/1995 | Kato et al. | .................... 257/431 |
| 5,923,796 | A | * | 7/1999 | Feldman et al. | ............... 385/14 |
| 6,399,964 | B1 | * | 6/2002 | Corr | ............................ 257/99 |

FOREIGN PATENT DOCUMENTS

| EP | 0 508 613 A1 | 10/1992 | |
|---|---|---|---|
| EP | 0 588 746 A1 | 3/1994 | |
| JP | 361230365 | * 10/1986 | ................... 257/81 |
| JP | 1 091 478 A | 4/1989 | |

* cited by examiner

Primary Examiner—Steven Loke
Assistant Examiner—Donghee Kang
(74) Attorney, Agent, or Firm—William W. Cochran, LLC

(57) ABSTRACT

An integrated circuit device (10) comprises a semiconductor die (14) and an optical signal emitting diode (18) for communicating an optical signal, such as a clock or trigger signal, to individual circuits on the die (14). Each circuit includes a photosensitive active device implemented on the die for converting the received optical signal to an electronic signal for clocking or triggering a local circuit (e.g., a data storage register). Translucent material (20) encapsulates the emitter diode (18) and the die (14). The optically communicated signal has very low skew, which is independent of the topology of the die (14).

16 Claims, 3 Drawing Sheets

LOW SKEW SIGNAL DISTRIBUTION FOR INTEGRATED CIRCUITS

This invention relates to the distribution of signals in, or for, integrated circuits, with minimal signal skew. The invention is particularly suited to distributing signals such as clock or trigger signals, but it is not limited exclusively to such signals.

Within integrated circuits, clock signals are usually distributed across the integrated circuit die by metal interconnect layers. This has the intrinsic disadvantage that the metal layer used to distribute the clock signal can be affected by signal path "wires" in other layers running parallel to, or crossing, the clock signal "wires".

These wires in other layers cause problems because they couple capacitively with the clock wire, causing variations in the speed at which the clock signal can be propagated around the die. The variation in propagation delay is referred to herein as "skew". Skew is important because it can be very difficult to ensure that the clock pulses reach different parts of the die at the same time. Skew is one of the factors which can severely limit the maximum operating speed of the integrated circuit; problems can occur if some parts of the integrated circuit are operating out of sequence with others, due to a large clock signal skew.

Even if very sophisticated clock signal routing algorithms are used, the clock wires will always be running near other wires. It is possible to predict the capacitive effect of wires running in close proximity to each other by using a special routing algorithm. However, such predictions are only effective for DC signal conditions; it is harder to predict the actual effect which may occur if the wires carry switching signals which have a different effect from a DC line, even for simple circuit configurations. With the increasing complexity of integrated circuits with many billions of internal wires, it is difficult even to predict DC coupling effects, and virtually impossible to predict dynamic switching effect in realistic design timescales.

The above problems can often delay development and design of integrated circuits, and increase development costs. Different arrangements of clock wires may be tried and refined progressively to counter the effects of unpredictable skew.

Techniques for communicating an optical signal have been proposed, for example in U.S. Pat. No. 5,394,490 and EP 0588746, and also in co-owned UK patent application No. 9712177.6.

Broadly speaking, one aspect of the invention is to communicate, and/or distribute signals optically within an integrated circuit package, such that the optical signals are available across (or illuminate) the majority of the surface of the integrated circuit die; to convert the optical signals to electronic signals on the integrated circuit die at a plurality of different conversion sites; and, at at least one site, to condition (or "clean up") the electronic signals, and to distribute the electronic signals to a plurality of "local" circuits driven by the signal from the conversion site. In a preferred form, the electronic signals are clock signals or trigger signals.

The term "optical" as used herein is not restricted to visible light, but is intended to refer generally to radiation which substantially obeys the laws of optics.

Such a technique can avoid the problems of capacitive coupling and other signal interference encountered with traditional interconnect wires, and enable signals to be distributed with minimal signal skew. The speed of signal propagation is limited only by the speed of light (and the switching speed of the circuit components used to produce and receive the optical signals, which is predictable). For example, for a 15 mm die, the attainable skew could be as small as about 50 ps. This compares very favourably with the minimum of about 400 ps which is attainable with conventional distribution wires. It is expected that future technologies will require a skew of less than about 200 ps, which will be very difficult to achieve using conventional wire techniques.

Moreover the invention can be used to distribute signals, such as clock or trigger signals, simultaneously to different parts of the integrated circuit die, without the same routing and design constraints as those associated with distribution wires. This can provide the die designer with greater flexibility of design, and allow circuits to be arranged on the die in relative positions not hitherto regarded as practical.

The invention can enable development time and costs to be reduced by producing predictable skew across the die. Furthermore, by not using metal wires to distribute clock signals, the number of layout steps would be reduced, which further reduces the time needed to complete a design.

An optical signal may be produced by an optical emitter carried on the die, or carried within the integrated circuit package containing the die, or mounted externally to provide an optical input to the package. The optical signal may illuminate substantially an entire surface of the die, or one or more predetermined areas of the die. Opaque masks may be used to mask areas of the die not intended to receive optical radiation (for example, to reduce unwanted photoelectric effects). If desired an optical guide (i.e. a light guide) may be provided to define predetermined optical paths for the optical signal. Such a guide may be provided by translucent material which can diffuse the light to achieve excellent omni-directional illumination, and avoid shadow effects.

More than one emitter may be used to generate a larger magnitude optical signal, or a plurality of different optical signals.

Each optical signal may be directly equivalent to the signal it represents, so that a digital pulse (e.g., a clock pulse) is represented by an optical pulse. Alternatively, the optical signals may be encoded, for example by modulation.

The optical signal may represent a single signal, or it may represent a plurality of signals. For example, the plurality of signals may be multiplexed, or have different characteristic carrier or modulation frequencies, or be represented by different radiation wavelengths, to enable individual signals to be separated either optically or electronically.

In a preferred embodiment, the optical signals are clock signals, and are distributed across the die and used to clock a plurality of circuit elements, for example, data storage registers. Each element may have, or be associated with, its own optical receiver. Alternatively pluralities of elements may be grouped together and fed from a respective optical receiver for the group. In this way, the optical technique is used to distribute signals on a die-scale, and local wires are then used to distribute the signals to local circuits. A circuit may used to provide a local clock signal different from, but derived from, the optical signal. In this way, the local circuits can be driven by locally generated signals which are synchronised across the die to the optical signal.

In a specific aspect, the invention provides an integrated circuit device comprising an integrated circuit die, and optical means for distributing a clock or trigger signal to different areas of the die.

In another aspect, the invention provides an integrated circuit device comprising an integrated circuit die, optical means for distributing an optical signal to at least first and second areas of the die, a first optical receiver implemented in or on the first area of the die for producing a first electronic signal synchronised to the optical signal, and a second optical receiver implemented in or on the second area of the die for producing a second electronic signal synchronised to the optical signal.

In a further aspect, the invention provides an integrated circuit comprising an optically clockable or triggerable, data signal handling circuit, the data signal handling circuit comprising an optical receiver for receiving an optical signal, and for producing an electronic clock or trigger signal therefrom.

In a yet further aspect, the invention provides a method of communicating a signal to an integrated circuit device and/or for distributing a signal to a plurality of circuits within an integrated circuit device, the method comprising communicating the signal optically, and generating at least one electronic signal responsive to the reception thereof by a circuit on the integrated circuit die.

In a yet further aspect, the invention provides a method of distributing a clock or trigger signal to different areas of an integrated circuit die of an integrated circuit device, the method comprising communicating the signal optically in the integrated circuit device.

An embodiment of the invention is now described by way of example, with reference to the accompanying drawings, in which.

Figure 1:
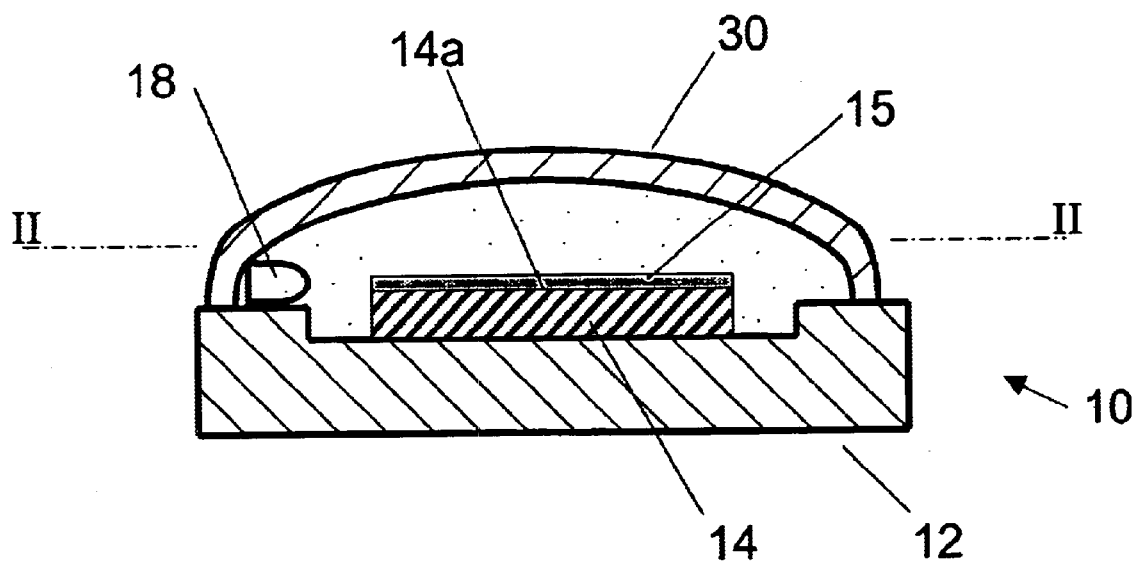
FIG. 1 is a schematic section through an integrated circuit package.
Figure 2:
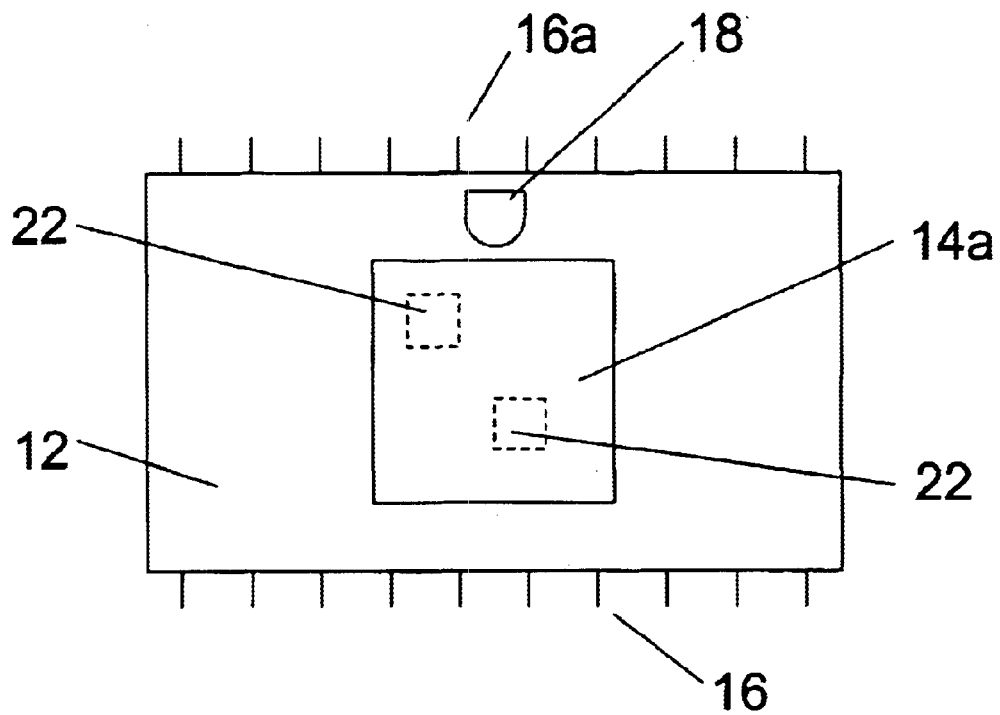
FIG. 2 is a schematic section along the line II—II of FIG. 1.

Referring to FIGS. 1 and 2, an integrated circuit device 10 consists of a package base 12 on which is carried an integrated circuit die 14. In this embodiment, the die 14 is based on a silicon substrate, but other embodiments may use different semiconductor materials. In FIG. 1, the conventional package terminal pins or balls, and the connections between the pins (or balls) and the die, have been omitted for the sake of clarity; these features are well known to the skilled man. Pins are denoted schematically in FIG. 2 by numeral 16.

Figure 1A:
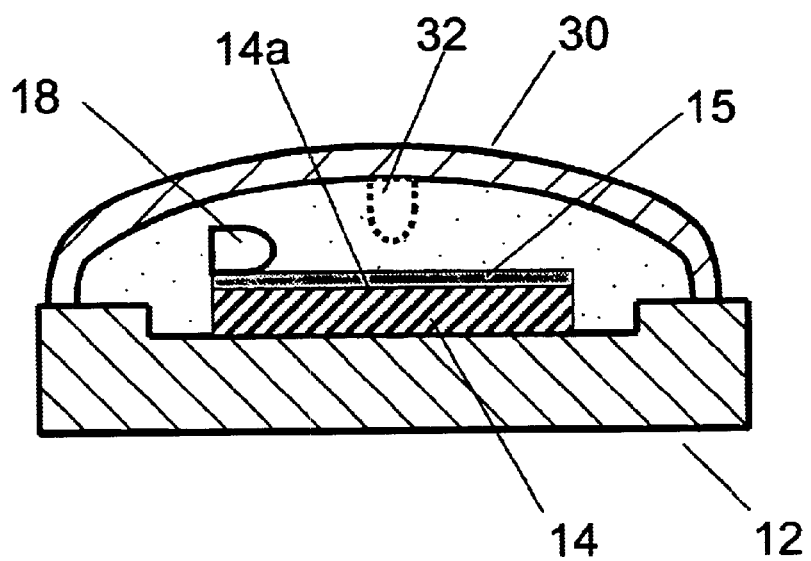
Figure 1B:
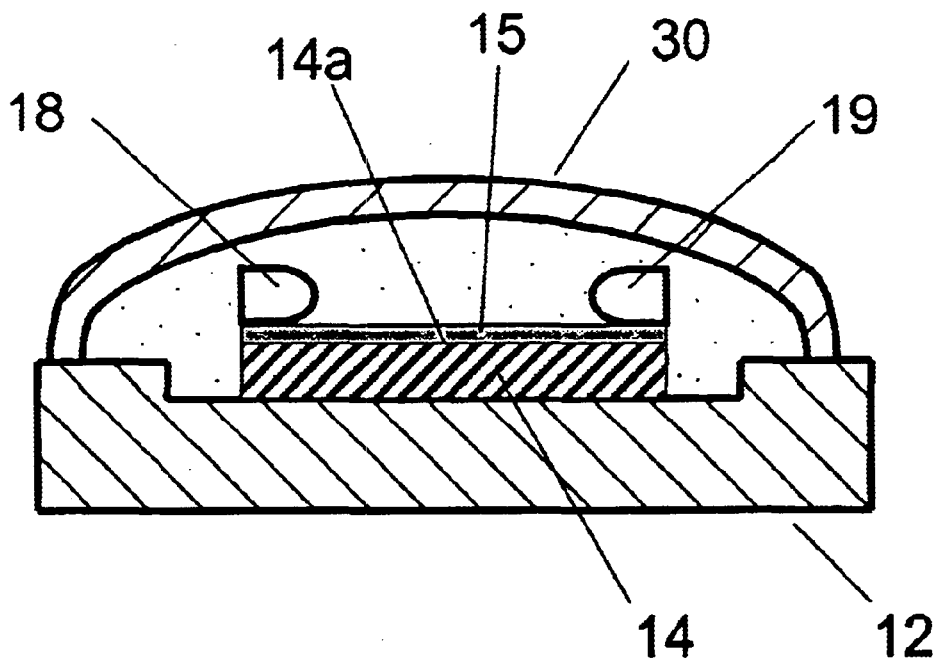

The device 10 includes an optical emitter 18 mounted on one side of, and slightly above, the upper surface 14a of the die 14. The emitter 18 is supported by the package base 12 and is attached thereto, for example, by adhesive. The die 14 and the emitter 18 are covered by translucent encapsulation material 20 to allow light emitted by the emitter 18 to fall on the die surface. An opaque mask 15, as shown in FIGS. 1A and 1B, may be disposed on the surface 14a of die 14 to mask areas of the die not intended to receive optical radiation. The emitter 18 is driven by an external signal applied to one or more respective "clock input" pins 16a of the device 10. The emitter may be carried on the die as depicted in FIG. 1A. A second emitter 19 is depicted in FIG. 1B. More than one emitter may be used to generate a larger magnitude optical signal, or a plurality of different optical signals.

Referring especially to FIG. 2, the die 14 includes a plurality of circuit elements 22, two of which are illustrated. The size of the elements is greatly exaggerated in FIG. 2 for the sake of clarity; this figure is purely schematic. Each circuit element 22 includes an optical receiver, in the form a phototransistor or photodiode 24, positioned in the die 14 to receive optical radiation through the upper face 14a. The light signals are used as clock signals for clocking operation of the circuit elements 22.

Figure 3:
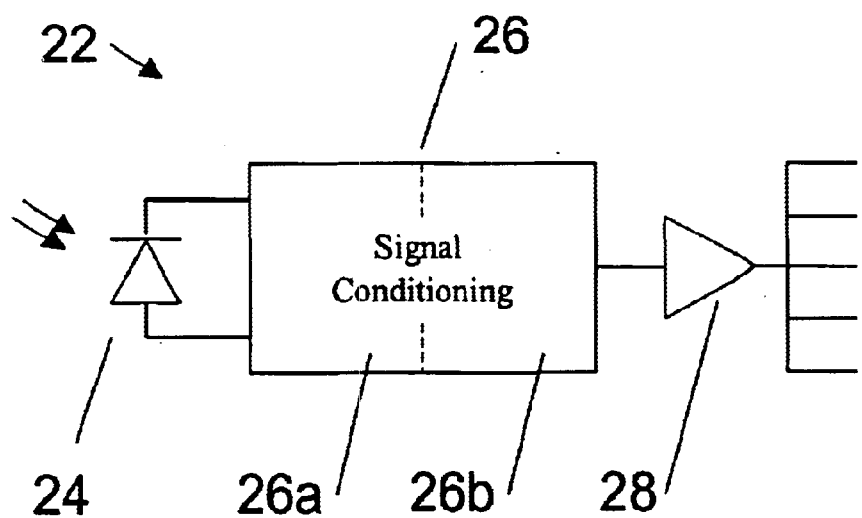
FIG. 3 is a schematic circuit diagram of a circuit element implemented on the integrated circuit die.

FIG. 3 illustrates an example of a circuit element 22. The output from the photodiode (24) is coupled to the input of a conditioning circuit 26, which may typically include an amplifier 26a and a thresholding circuit 26b for conditioning the optically received signal. The output from the conditioning circuit 26 represents a usable clock signal, and is provided as a clock input to a data storage register 28, to clock the register 28.

In this embodiment, the translucent encapsulation 20 serves to diffuse the light from the emitter 18, so that the orientation of the emitter 18 is not critical. The diffusion enables the die to be uniformly illuminated, and can avoid the creation of shadows which might otherwise result from the oblique position of the emitter 18. The encapsulation 20 is covered by an opaque layer 30 to prevent external radiation from interfering with the optical clock signal. The diffusion also enables the light to reach positions on or in the die which are not in line-of-sight with the emitter 18. For example, the light can penetrate to active lower layers of the die 14 on which some of the phototdiodes 24 may be formed, and to reach the sides of the die.

In this embodiment, the emitter 18 is positioned adjacent to, and symmetrically relative to, the die 14 to reduce signal skew. However, in other embodiments, the emitter may be arranged at a greater distance from the die, or non-symmetrically relative to the die.

Figure 1C:
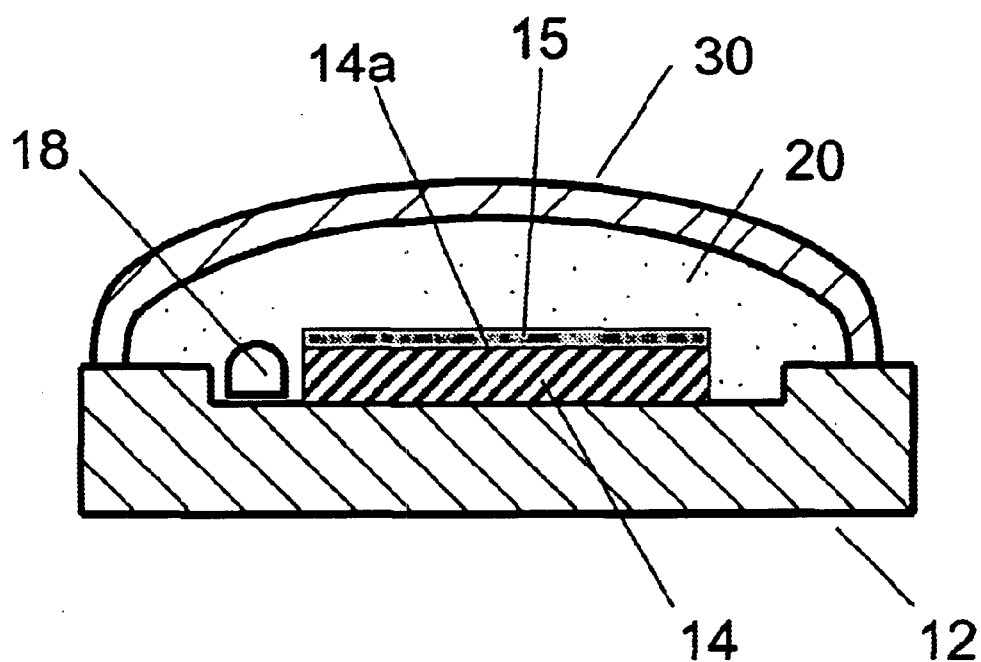

In this embodiment, the emitter 18 is mounted in almost the same plane as the die 14, so that the height profile of the device 10 is not substantially increased. Moreover, the upper region of the device is left clear for mounting a heatsink, if desired. In an alternative embodiment, the emitter could be mounted below the upper face 14a of the die 14, as depicted in FIG. 1C, and the diffusion caused by the translucent encapsulation 20 could spread light over the die 14.

In another alternative embodiment the emitter 18 may be mounted above the die 14 and point downwardly (as depicted in phantom in FIG. 1 by numeral 32). Such an arrangement can reduce signal skew even further, but might not be practical if a heatsink is desired to be mounted.

The emitter 18 may be implemented as a light emitting diode, or as a laser diode, or as any other suitable device capable of be operated at a desired switching speed. The emitter may emit radiation in the visible wavelength range or, for example, in the infra-red wavelength range.

The photodiode 24 can be integrated very simply, because all metal oxide semiconductor (MOS) active devices have a photoelectric effect. All that is required is a different type of layout structure from conventional transistors to maximise this effect. To ensure that other MOS devices are not affected by the light signals, an additional opaque layer may be added to the top of the die during the manufacturing process. Holes would be created in the opaque layer to allow light penetration to the areas of the photodiodes. This technique is not limited only to MOS devices, as other semiconductor devices exhibit similar photo-sensitivity.

It will be appreciated that the foregoing description is merely illustrative of a currently preferred embodiment, and that many modifications may be made without departing from the principles of the invention. In particular, the package construction, the arrangement of the optical emitter(s) and of the optical receivers, and the die may vary with different device styles and semiconductor implementations.

It will be appreciated that the invention, particularly as described in the preferred embodiments, can enable signals to be communicated to, or distributed in, an integrated circuit device with much less signal skew than conventional techniques using interconnect wires. Just as importantly, die amount of skew is largely independent of the die topology, and can easily be predicted. The invention can overcome many of the problems which limit current maximum integrated circuit speeds, and can enable the design time for a new integrated circuit to be significantly reduced.

While features believed to be of importance have been identified in the appended claims, the Applicant claims protection for any novel feature or combination of features described herein and/or illustrated in the accompanying drawings, irrespective of whether emphasis has been placed thereon.

What is claimed is:

1. An integrated circuit device comprising:
   an integrated circuit die having a surface and at least first and second areas on said surface;
   a first optical emitter disposed on said surface of said die wherein said optical emitter is operable to transmit an optical signal to said first and second areas on said surface;
   a first optical receiver located in said first area producing an electrical signal in response to said optical signal;
   a second optical receiver located in said second area producing an electrical signal in response to said optical signal; and
   an opaque mask used to mask areas of said die not intended to receive said optical signal.

2. The integrated circuit device of claim 1, wherein said first optical emitter is a light emitting diode.

3. The integrated circuit device of claim 1 wherein said first optical emitter is a laser diode.

4. The integrated circuit device of claim 1 wherein said integrated circuit die includes an optical guide.

5. The integrated circuit device of claim 1 wherein said integrated circuit die and said first optical emitter are covered by a translucent encapsulation material that serves to diffuse said optical signal from said first optical emitter.

6. The integrated circuit device of claim 1 wherein said optical emitter is disposed below the upper face of said integrated circuit die.

7. The integrated circuit device of claim 1 wherein said first optical receiver comprises a photodiode.

8. The integrated circuit device of claim 7 wherein said photodiode is coupled to the input of a conditioning circuit.

9. The integrated circuit device of claim 8 wherein an output from said conditioning circuit is provided as a clock input to a data storage register.

10. The integrated circuit device of claim 1 wherein a second optical emitter is disposed on said surface of said integrated circuit die.

11. The integrated circuit device of claim 10 wherein said first optical emitter and said second optical emitter generate a larger magnitude optical signal.

12. The integrated circuit device of claim 10 wherein said first optical emitter and said second optical emitter generate different optical signals.

13. The integrated circuit device of claim 1 wherein said integrated circuit die is based on a silicon substrate.

14. The integrated circuit device of claim 8 wherein said conditioning circuit comprises an amplifier and a thresholding circuit.

15. The integrated circuit device of claim 7 wherein said photodiode is integrated on said integrated circuit die.

16. An integrated circuit device comprising:
   an integrated circuit die having a surface and at least first and second areas on said surface;
   an optical emitter disposed on said surface of said die;
   a first optical receiver located in said first area producing a first electrical signal in response to an optical signal wherein said first optical receiver is coupled to a first data signal handling circuit responsive to said first electrical signal produced by said first optical receiver;
   a second optical receiver located in said second area producing a second electrical signal in response to said optical signal wherein said second optical receiver is coupled to a second data signal handling circuit responsive to said second electrical signal produced by said second optical receiver;
   a translucent encapsulation material that covers said optical emitter and the upper surface of said integrated circuit die and that allows light emitted by said optical emitter the fall on said upper surface of said integrated circuit die; and
   an opaque mask used to mask areas of said die not intended to receive said optical signal.

* * * * *